Patented Feb. 2, 1937

2,069,461

UNITED STATES PATENT OFFICE 2,069,461

DIAZOAMINO COMPOUNDS AND PROCESS FOR THEIR PRODUCTION

Pierre Petitcolas, Rouen, France, assignor to Compagnie Nationale de Matières Colorantes et Manufactures de Produits Chimiques du Nord Reunies, Etablissements Kuhlmann, Paris, France, a corporation of France No Drawing. Application April 13, 1936, Serial No. 74,196. In France April 20, 1935

8 Claims. (Cl. 260—69)

It is known that diazo amino compounds which can be used in printing can be obtained by causing diazo derivatives containing no solubilizing groups to react with primary amines of the benzene series containing either a carboxylic acid group and a sulphonic group, or merely a sulphonamide group or several sulphonic groups. However the number of primary amines containing these solubilizing groups and being suitable for a given diazo derivative is fairly limited, on one hand because the electronic character of the bases must be such that the diazoamino compound is formed and can subsequently be suitably split up in an organic acid medium, and on the other hand because the diazoamino compound must be capable of easy separation from its medium of formation and must then be sufficiently soluble in a caustic alkali medium to be capable of utilization in printing.

It has been found according to the present invention that diazoamino compounds which fulfil the above conditions in a particularly advantageous manner are obtained by combining the same diazo compounds with primary or secondary amines of the benzene series containing a sulphonamide group which may be substituted and one or more carboxylic groups which are free or form a benzoyl sulphimide ring with the neighboring sulphonamide group. The presence of a sulphonamide group combined with that of the carboxylic groups confers upon such compounds properties which could not be foreseen. In particular the diazoamino compounds containing for example a COOH group and a $SO_2NH_2$ group are of slight solubility in the presence of bicarbonates, alkaline acetates and even alkaline carbonates, but on the other hand are of considerable solubility in a caustic alkaline medium; these properties are most favorable for obtaining the diazoamino compounds in the concentrated form and for their use.

In these conditions it is possible to prepare in excellent yields a large number of diazoamino compounds in the presence of alkaline bicarbonates, carbonates or acetates. Very often when a sulphonated derivative is employed one is obliged to salt out up to saturation the solution containing the diazo amino compound; on the contrary in employing the sulphonamide derivative it is possible to filter the compound without addition of salt and even to wash it with pure water in order to remove all mineral salts. In addition in certain cases it is impossible to obtain with the carboxy-sulphonated derivatives compounds sufficiently soluble for industrial use; thus mono-benzoylated paradiamines of the benzene series likewise containing an alkoxy group and an atom of halogen give with anthranilic-4-sulphonic acid condensation products which are extremely slightly soluble in a caustic alkaline medium; this insolubility necessitates the utilization of very complex stabilizers. On the contrary by using anthranilic acid-4-sulphonamide it is possible to obtain with caustic soda very concentrated solutions of these compounds which do not precipitate even in the cold. It is very astonishing that this result is arrived at by replacing a $SO_3H$ group by a $SO_2NH_2$ group.

The insolubility in alkaline carbonate media of the compounds which have just been described affords in addition other advantages, in particular as regards keeping properties and sensitivity to atmospheric agents (humidity, carbonic acid, etc.) In addition, printing pastes made with the diazoamino derivatives in question often give printings of greater brightness than those obtained with the diazoamino derivatives containing only sulphonic or carboxylic groups.

Finally by utilizing certain amines containing a sulphonamide group and one or two carboxylic groups it is possible to obtain diazoamino compounds which can be used in printing even with strongly electronegative bases such as 2,6-dichloraniline, orthonitraniline, and metanitraniline.

Some primary or secondary amines containing a sulphonamide group and a carboxylic group are already known but some are described below for the first time, as also are their methods of preparation.

In particular by effecting a sulphochlorination of 2-nitro-1,3-xylene (an operation which has not hitherto been described) there is obtained the 2-nitro-1,3-xylene-4-sulphochloride which on condensation with ammonia or an amine gives for example the 2-nitro-1,3-xylene-4-sulphonamide and on oxidizing only one of the two methyl groups or the two methyl groups of these products and then reducing there are obtained new products of the formula:—

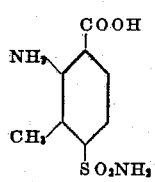 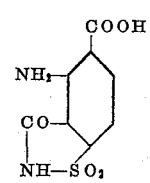

In the same way the derivatives of phenylglycine containing a sulphonamide group and utilizable according to the present invention can be obtained by condensing monochloracetic acid with the corresponding aminosulphonamides.

The diazoamino derivatives of the present invention can be utilized for the manufacture of azo dyestuffs by splitting up in an acid medium; the diazo derivative of the primary amine containing no solubilizing group is then liberated and can react with a coupling component. The splitting and the coupling can take place in the fibre for example after having printed thereon a mixture of the diazoamino compound with the sodium salt of a naphthol.

It is in addition possible to obtain identical results by preparing the diazoamino derivatives by the converse method, that is to say by condensing the primary aromatic amine containing no solubilizing group with the diazo derivative of the amine of the benzene series containing the sulphonamide group and the carboxylic group or groups which are free or condensed to the carbonyl sulphimide with the neighboring sulphonamide group.

The following examples illustrate the invention without limiting the same thereto:—

*Example 1*

*Example 3*

One tenth mol. of 4-chloro-o-toluidine is diazotized in the customary manner and there is prepared in addition a solution of 26 grams of 1-carboxy-2-amino-4-sulphonamidobenzene dissolved in 100 ccs. of water with caustic soda to a strongly alkaline reaction to Beta yellow. The term "Beta yellow" designates the non-ethyled dyestuff described in the work of Schulz, "Farbstofftabellen" 1931, page 216, No. 529, the formula of which is:

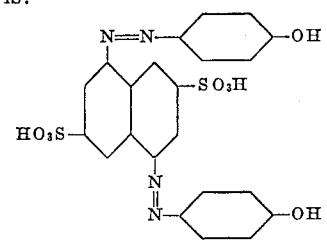

There are added to this solution 200 ccs. of a 20% sodium acetate solution. There is then allowed to flow in with brisk stirring the diazo solution; after some moments there is obtained an abundant precipitation of large yellow crystals.

The diazoamino compound appears in the form of fine clear yellow crystals which are perfectly soluble in dilute caustic soda; it corresponds to the formula:

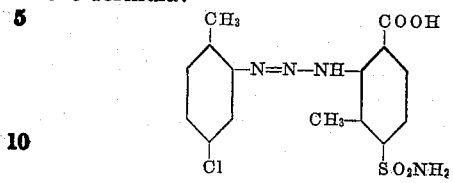

There is obtained in an identical manner with m-chloraniline the compound:

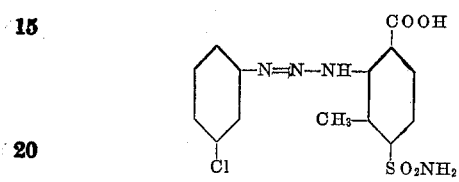

Example 5

18 grams of 1-methoxy-2-benzoylamino-4-chlor-5-aminobenzene are diazotized with 7 grams of sodium nitrite in the presence of 40 ccs. of hydrochloric acid (d=1.16). The diazo derivative being only slightly soluble, the volume must be made up to 200 ccs. There is prepared in addition a solution of 25 grams of 1-carboxy-2-amino-3-methyl-4-sulphamidobenzene in dilute caustic soda to a slight reaction on yellow thiazole paper; there are then added 20 grams of crystallized sodium acetate. The term "yellow thiazole paper" designates the paper used for the control of the alkalinity which consists of a paper impregnated with a dyestuff, so-called "yellow thiazole", known also as "Clayton yellow" or "Mimosa yellow". This dyestuff tones to a bright red under the action of an alkali. It has the following formula:

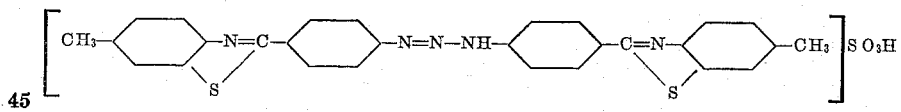

The diazo solution is caused to flow with energetic stirring into the solution of the stabilizer. A voluminous precipitate is otained. After some moments stirring the whole is rendered alkaline with sodium bicarbonate. The whole is stirred for one hour and then filtered. The diazo amino compound is completely insoluble in the medium of formation. It dissolves on the other hand perfectly in dilute caustic soda. It corresponds to the formula:

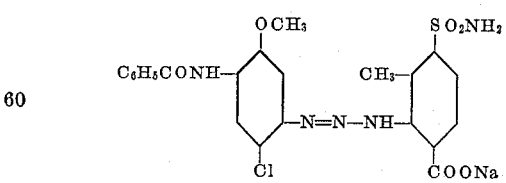

Example 6

16 grams of 1-amino-2,5-dichlorobenzene are diazotized at a temperature in the neighborhood of 0° C. with 35 ccs. of HCl of density 1.16 and 76 grams of sodium nitrite. The diazo solution is caused to flow into a slightly alkaline solution of 30 grams of 1-carboxy-2-amino-3,4-carboxyl-sulphimidobenzene, to which have been added 30 grams of crystallized sodium acetate. After some moments stirring the whole is rendered alkaline with bicarbonate and the yellow crystals filtered which correspond to the formula:

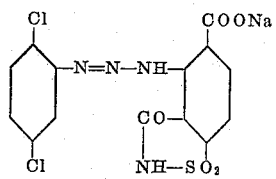

Example 7

One-tenth mol. of p-nitraniline is diazotized in the customary manner. The diazo solution is allowed to flow into a slightly alkaline solution containing a little more then one-tenth mol. of 1-carboxy-2-amino-3-methyl-4-sulphamidobenzene and an excess of sodium acetate. There is immediately obtained an abundant yellow-orange precipitate. The whole is rendered alkaline with sodium carbonate and after some hours stirring the diazoamino compound is filtered which corresponds to the formula:

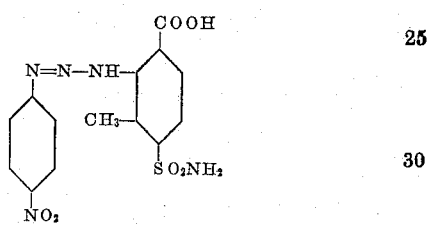

The crystals are easily dried and are completely soluble in cold dilute caustic soda with a blood red coloration. The conversion into a diazo derivative is effected easily by means of hot dilute organic acids.

There is obtained in the same manner by replacing the p-nitraniline by m-nitraniline the diazoamino compound corresponding to the formula:

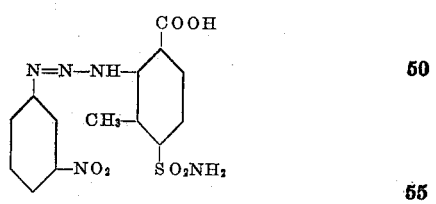

in the form of lemon yellow crystals which are very soluble in cold dilute caustic soda with an orange coloration.

Example 8

There is prepared a powder containing in 100 grams 0.1 mol. of the first diazoamino compound described in Example 3 and 0.1 mol. of o-toluidide of beta-hydroxy-naphthoic acid.

A printing paste is made containing:
80 grams of the powder thus prepared
50 grams of caustic soda 35° Bé.
260 grams of water
600 grams of starch-tragacanth thickening
10 grams of thiodiglycol.

A cotton fabric is printed with this paste, dried, steamed in acid steam, rinsed, soaped at 90° C. and rinsed. There is obtained a bright red print of excellent fastness properties.

Example 9

There is heated to boiling for 8 hours a mixture of 172 grams of 1-amino-3-benzene-sulphonamide, 100 grams of mono-chloracetic acid and 600 ccs. of water. The sulphonamide gradually disappears. The whole is allowed to crystallize slowly and the condensation product obtained is filtered which corresponds to the formula:

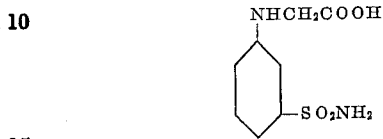

The aminosulphonamide remaining in the filtrate can be recovered in the form of hydrochloride by neutralization with an alkaline carbonate.

There are obtained in the same manner phenylglycines substituted in the same manner by replacing the 1-amino-3-benzene sulphonamide by 1-amino-2-benzene-sulphonamide, 1-methyl-2-amino-4-benzene-sulphonamide, 1,3-dimethyl-4-amino-6-benzene-sulphonamide, 1,3-dimethyl-2-amino-4-benzene-sulphonamide, etc.

Example 10

There are diazotized in the customary manner 28.3 grams of 1-methyl-2-amino-5-chlorobenzene. There is prepared in addition a solution of 50 grams of 3-sulphamido-1-phenylglycine in 400 ccs. of water to which are added 80 grams of crystallized sodium acetate and 35 ccs. of caustic soda of 35° Bé. This solution is rendered neutral to Beta yellow with a little acetic acid.

The whole is cooled externally with a freezing mixture and the preceding diazo solution is caused to flow in. The diazoamino compound precipitates gradually and after two hours stirring only traces of diazo compound can be detected in the solution. Neutralization is effected with about 40 grams of sodium bicarbonate and the whole is stirred for several hours. The crystals are filtered without any other addition. The diazoamino compound which is separated in the form of practically colorless crystals corresponds probably to the formula:

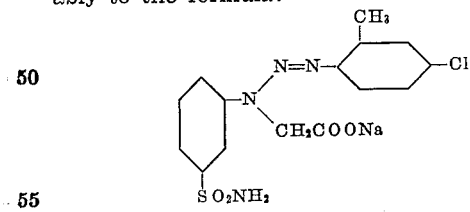

This compound is scarcely soluble in water but on the other hand very soluble in dilute alkalies. The yield is excellent. It is dried at a low temperature. It is possible to isolate in an analogous manner under good conditions with the same stabilizer, diazoamino compounds corresponding to m-chloraniline, 1-methyl-2-amino-4-chlorbenzene, 1-amino-2,5-dichlorobenzene, 1-methoxy-2-amino-4-chlorobenzene, etc.

Example 11

28.3 grams of 1-methyl-2-amino-4-chlorobenzene are diazotized in the customary manner. The diazo solution is allowed to flow into a solution obtained as in the preceding example with 55 grams of 1-methyl-4-sulphamido-2-phenylglycine. There is observed the gradual formation of an abundant yellow precipitate and, after 2 hours' stirring, no diazo compound can be detected in the solution. There are added gradually 40 grams of sodium bicarbonate and the whole is stirred for several hours at ordinary temperature. There are then allowed to flow into the mass 70 ccs. of caustic soda of 35° Bé. The precipitate passes into solution. Filtration is effected to eliminate a small quantity of insoluble products and after dilution to about 1 litre and addition of 200 grams of common salt the diazoamino compound is precipitated by passing a current of carbon dioxide until there is no alkaline reaction to phenolphthalein paper. After several hours' stirring the crystals are filtered and dried at a moderate temperature. These crystals correspond probably to the formula:

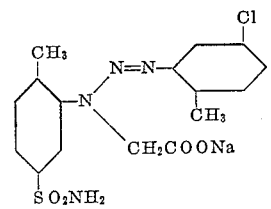

There are obtained in the same manner diazo compounds with m-chloraniline, 1-methyl-2-amino-5-chlorobenzene, etc.

Example 12

There is prepared a solution of 30 grams of 1,3-dimethyl-4-sulphamido-2-phenylglycine in 300 ccs. of water to which have been added 40 grams of crystallized sodium acetate and 12 ccs. of caustic soda of 35° Bé. There is poured into this cooled solution a diazo solution prepared in the customary manner with 14 grams of 1-methyl-2-amino-4-chlorobenzene. After one hour stirring there are added gradually 30 grams of sodium bicarbonate. After some hours the solution of the precipitate which was formed is complete. Filtration is effected to eliminate a small quantity of decomposition products and the filtrate is saturated with common salt. The diazoamino compound precipitates at first in a pasty form then gradually crystallizes. It dissolves easily in dilute alkalies.

There is prepared in the same manner, using as stabilizer 1,3-dimethyl-6-sulphamido-4-phenylglycine and as diazotizable base 1-methoxy-2-amino-4-chlorobenzene the diazoamino compound corresponding to the formula:

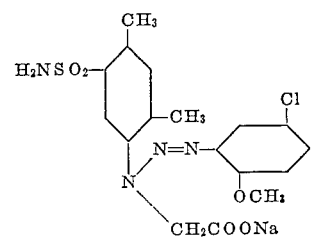

Example 13

50 grams of the diazo amino compound prepared as described in Example 10 and containing 28% of 1-methyl-2-amino-5-chlorobenzene, are intimately mixed with 30 grams of 2'-methyl-4'-methoxyanilide of 2-hydroxynaphthalene-3-carboxylic acid. There is obtained a clear beige powder dissolving easily in dilute alkalies.

A printing paste is made containing:
  80 grams of the powder thus prepared
  40 grams of caustic soda of 35° Bé.
  260 grams of water
  600 grams of starch-tragacanth thickening
  20 grams of thiodiglycol.

8. The diazoamino compounds of the general formula:

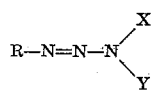

in which R represents the radical of a primary aromatic amine which does not contain a solubilizing group, and X and Y represent the radicle of another amine which is a member of the group consisting of primary and secondary amines of the benzene series containing a sulphamido group, and at least one carboxyl group.

PIERRE PETITCOLAS.

A cotton fabric is printed with this paste, dried, steamed with acid steam, rinsed, soaped at 90° C. and rinsed.

There is obtained a bright red print of excellent fastness properties.

*Example 14*

47 grams of the diazoamino compound prepared as described in Example 11 and containing 30% of 1-methyl-2-amino-4-chlorobenzene are mixed with 30 grams of the o-phenetidide of beta-hydroxynaphthoic acid and 23 grams of anhydrous sodium acetate.

A printing paste is made containing:
80 grams of the powder thus prepared,
50 grams of caustic soda 35° Bé.,
250 grams of water,
600 grams of starch-tragacanth thickening,
20 grams of thiodiglycol.

A cotton fabric is printed with this paste, dried, steamed in acid steam, rinsed, soaped at 90° C. and rinsed.

A bright scarlet print is obtained of excellent fastness properties.

*Example 15*

47 grams of the diazoamino compound prepared as described in Example 10 with 3-sulphamido-1-phenylglycine and containing 30% of the base 1-methyl-2-amino-4-chlorobenzene, are intimately mixed with 30 grams of diacetoacetyl-o-tolidine and 23 grams of anhydrous sodium acetate.

A printing paste is made containing:
80 grams of the powder thus prepared,
50 grams of caustic soda 35° Bé.,
250 grams of water,
600 grams of starch-tragacanth thickening,
20 grams of thiodiglycol.

A cotton fabric is printed with this paste, dried, developed at 80° C. in a bath of dilute acetic acid containing sodium sulphate, rinsed, soaped at 90° C. and rinsed.

A yellow print is obtained of excellent fastness properties.

*Example 16*

58 grams of the diazoamino compound corresponding to the formula:

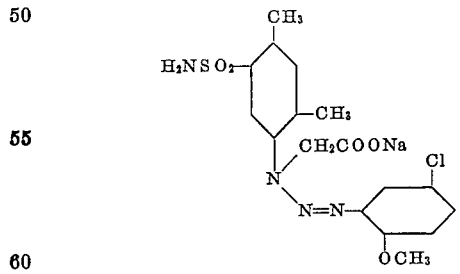

and containing 28% of 1-methoxy-2-amino-4-chlorobenzene are ground with 30 grams of o-anisidide of beta-hydroxynaphthoic acid and 12 grams of anhydrous sodium acetate.

A printing paste is made containing:
80 grams of the powder thus prepared,
40 grams of caustic soda 35° Bé.,
260 grams of water,
600 grams of starch-tragacanth thickening,
20 grams of thiodiglycol.

A cotton fabric is printed with this paste, dried, developed at 80° C. in a dilute acetic acid bath containing sodium sulphate, rinsed, soaped at 90° C. and rinsed.

There is obtained a bright red print of excellent fastness properties.

What I claim is:

1. Process for the manufacture of diazoamino compounds by diazotizing an amine and condensing in a medium which must not be strongly acid with another amine, the one amine being a primary aromatic amine which does not contain a solubilizing group and the other amine being a primary amine of the benzene series containing a sulphamido group and a carboxyl group which forms a carbonyl-sulphimide ring with the neighboring sulphamido group.

2. Process for the manufacture of diazoamino compounds by diazotizing an amine and condensing in a medium which must not be strongly acid with another amine, the one amine being a primary aromatic amine which does not contain a solubilizing group and the other amine being a primary amine of the benzene series containing a sulphamido group, a free carboxyl group and a carboxyl group which forms a carbonyl-sulphimide ring with the neighboring sulphamido group.

3. Process for the manufacture of diazoamino compounds by diazotizing an amine and condensing in a medium which must not be strongly acid with another amine, the one amine being a primary aromatic amine which does not contain a solubilizing group and the other amine being a primary amine of the benzene series containing a sulphamido group and several free carboxyl groups.

4. Process for the manufacture of diazoamino compounds by diazotizing an amine and condensing in a medium which must not be strongly acid with another amine, the one amine being a primary aromatic amine which does not contain a solubilizing group and the other amine being a secondary amine of the benzene series containing a sulphamido group and a carboxyl group which forms a carbonyl-sulphimide ring with the neighboring sulphamido group.

5. Process for the manufacture of diazoamino compounds by diazotizing an amine and condensing in a medium which must not be strongly acid with another amine, the one amine being a primary aromatic amine which does not contain a solubilizing group and the other amine being a secondary amine of the benzene series containing a sulphamido group, a free carboxyl group and a carboxyl group which forms a carbonyl-sulphimide ring with the neighboring sulphamido group.

6. Process for the manufacture of diazoamino compounds by diazotizing an amine and condensing in a medium which must not be strongly acid with another amine, the one amine being a primary aromatic amine which does not contain a solubilizing group and the other amine being a secondary amine of the benzene series containing a sulphamido group and several free carboxyl groups.

7. Process for the manufacture of diazoamino compounds by diazotizing an amine and condensing in a medium which must not be strongly acid with another amine, the one amine being a primary aromatic amine which does not contain a solubilizing group and the other amine being a member of the group consisting of primary and secondary amines of the benzene series, containing a sulphamide group and at least one carboxyl group.